US007966758B2

(12) United States Patent
Scott Watts

(10) Patent No.: US 7,966,758 B2
(45) Date of Patent: Jun. 28, 2011

(54) POSITIONABLE FILE TAB

(76) Inventor: Susan Scott Watts, Corral de Tierra, CA (US)

( * ) Notice: Subject to any disclaimer, the term of this patent is extended or adjusted under 35 U.S.C. 154(b) by 0 days.

(21) Appl. No.: 12/140,147

(22) Filed: Jun. 16, 2008

(65) Prior Publication Data

US 2009/0307952 A1 Dec. 17, 2009

(51) Int. Cl.
*A01B 23/06* (2006.01)

(52) U.S. Cl. ................ 40/641; 40/359; 40/658; 40/666; 283/36

(58) Field of Classification Search ............. 24/DIG. 51, 24/DIG. 53, DIG. 61; 40/359, 360, 641, 40/647, 658, 661.05, 661.06, 661.07; 43/1, 43/4, 54.1, 57.1, 9.1; 428/40.1, 42.1, 42.2, 428/43, 195.1

See application file for complete search history.

(56) References Cited

U.S. PATENT DOCUMENTS 4,143,477 A 3/1979 Reynolds
4,637,149 A 1/1987 Rivkin
5,341,982 A 8/1994 Syers
5,417,457 A 5/1995 Reinhardt
5,513,459 A 5/1996 Schneider
5,890,307 A * 4/1999 Chapelle .......................... 40/641
RE36,596 E 3/2000 Schneider
6,269,573 B1 * 8/2001 Najmi ............................. 40/666
6,332,285 B1 12/2001 Aaldenberg et al.
6,880,858 B2 4/2005 Norenberg
6,928,761 B2 8/2005 Frappell
6,976,449 B2 12/2005 Weisenfeld
6,986,219 B1 * 1/2006 Raia ................................ 40/359
7,155,852 B2 * 1/2007 Vogler ............................ 40/658
7,225,570 B2 6/2007 Windorski
7,334,363 B1 2/2008 Hansen
7,610,707 B1 * 11/2009 Payne ............................. 40/641
2005/0257408 A1 11/2005 Black
2006/0226205 A1 * 10/2006 O'Leary et al. .............. 229/67.2
2007/0234601 A1 10/2007 Yoo et al.

* cited by examiner

*Primary Examiner* — Joanne Silbermann
*Assistant Examiner* — Shin Kim

(57) ABSTRACT

A method and apparatus for improved file folder identification is described. The apparatus includes a file tab having a tab portion rotatably coupled to a base. In one embodiment, a file folder identification apparatus is described. The apparatus includes a base comprising a first coupling portion and a second coupling portion adapted to couple to a file folder, the second coupling portion opposing the first coupling portion, and a tab portion comprising a temporary fastener detachably and rotatably coupled to the second coupling portion and a face configured to retain identification information.

14 Claims, 4 Drawing Sheets

POSITIONABLE FILE TAB

BACKGROUND OF THE INVENTION

1. Field of the Invention

Embodiments of the invention relate to a file folder identification device.

2. Description of the Related Art

File cabinets are used in many places for storage and indexing of file folders containing paper documents, among other articles. The two most common types of filing cabinets are lateral file cabinets and vertical file cabinets, each of which include one or more drawers or compartments containing the file folders. The file folders in the drawers or compartments may be hanging folders or otherwise supported by the compartment and/or other file folders within the same compartment. File folders used in either type of the filing cabinets typically include a file tab that identifies the contents of the individual file folder to a user. To access one or more files in the file cabinet, a user must open a door and/or extract a drawer to view the file tabs.

FIGS. 1A and 1B show isometric views of portions of conventional file cabinet drawers, shown as lateral file drawer D1 and vertical file drawer D2. Each of the drawers D1 and D2 include a plurality of file folders 2 having file tabs 4 attached thereto. Typically, as the drawer D1 and drawer D2 are opened by a user, the file tabs 4 are oriented in a single direction. The directional orientation of the file tabs 4 enable viewing of the file tabs 4 by a user standing or sitting at a specific position. For an optimal view point of the file tabs 4, a user may need to move to another position. For example, in the case of a drawer D2, the optimal viewpoint for identification of the file tabs 4 may be from a front of drawer D2, and in the case of drawer D1, the optimal viewpoint for identification of the file tabs 4 may be at a left or a right side of file drawer D1.

FIG. 1C is an isometric view of a conventional file folder 2 and file tab 4. Typically, the file tabs 4 are oriented generally coplanar with a plane P' and P" of the file folder 2 as shown in FIG. 1C. In some conventional products, the file tab 4 may be angled or bent slightly relative to the plane P' of the file folder 2 in order to facilitate viewing of the file tab 4 from a position above the file folder 2. Although the file tabs 4 of conventional construction may be permanently or temporarily bent to angle the file tab 4 relative to planes P' and P", the conventional file tabs 4 typically include a fixed connection 6 that prevents adjustment of the angular orientation of the file tab 4 relative to plane P' and/or plane P".

Viewing of the file tabs 4 from a position other than the optimal viewpoint, as described above, may require the user to move to a better vantage point. Examples include leaning over or across the drawers D1, D2, movement of the user's head, or other repositioning of the user's body to view or identify the file tabs 4. In the case of a vertical file cabinet that may be positioned laterally relative to a desk, chair or other workstation, the user must often move each time a file tab 4 within the cabinet needs to be read.

Therefore, there is a need for an improved file tab for enhanced file folder identification.

SUMMARY OF THE INVENTION

Embodiments described herein relate to a file folder identification device. In one embodiment, a file folder identification apparatus is described. The apparatus includes a base comprising a first coupling portion and a second coupling portion, the first coupling portion opposing the second coupling portion and configured for coupling to a file folder, and a tab portion comprising an interface detachably and rotatably coupled to the second coupling portion and a face configured to retain identification information.

In another embodiment, a file folder identification apparatus is described. The apparatus includes a first coupling portion and a second coupling portion, the first coupling portion opposing the second coupling portion and configured for coupling to a file folder, and a tab portion, comprising an interface comprising a temporary fastener detachably and rotatably coupled to the second coupling portion and a face configured to retain identification information.

In another embodiment, a file folder identification apparatus is described. The apparatus includes a tab portion, and a base comprising a first coupling portion and a second coupling portion, the tab portion rotatably and detachably coupled to the second coupling portion by one of a plurality of flexible fingers, a snap fastener, a hook and loop connection, or a magnetic material.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally provide methods and apparatus for improving file folder identification. The apparatus includes a positionable file tab adapted to couple to a file folder. The positionable file tab comprises a base and a tab portion movably coupled thereto by at least one coupling interface. The coupling interface allows a user to turn the tab portion relative to the base to view the tab portion.

Figure 1C:
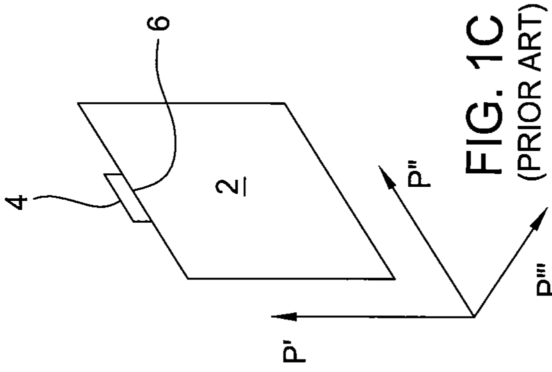
FIG. 1C (PRIOR ART)
FIG. 1C is an isometric view of a file folder and file tab according to the prior art.
Figure 1B:
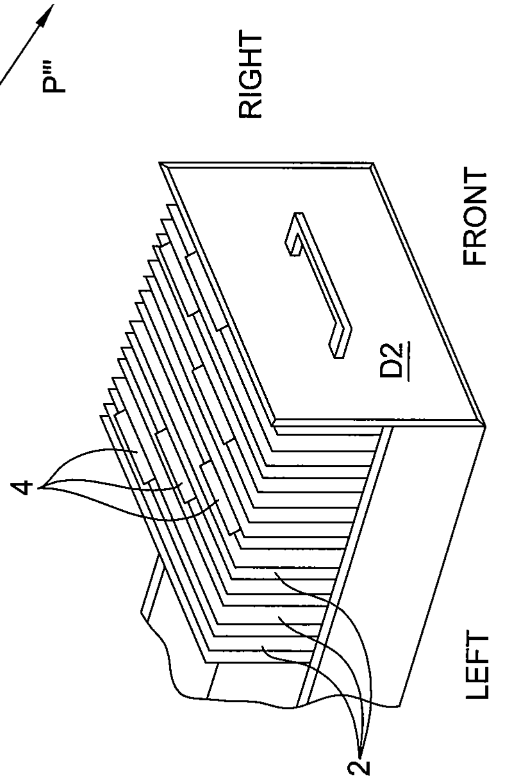
FIG. 1B (PRIOR ART)
FIG. 1B is an isometric view of a portion of a vertical file drawer and file folders having file tabs according to the prior art.
Figure 1A:
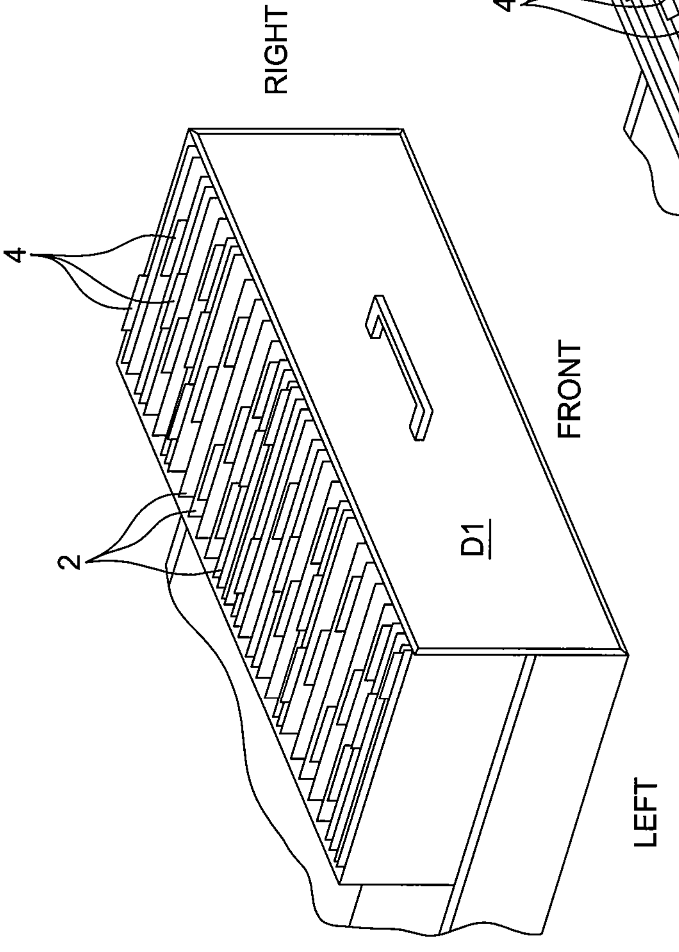
FIG. 1A (PRIOR ART)
FIG. 1A is an isometric view of a portion of a lateral file drawer and file folders having file tabs according to the prior art.
Figure 2A:
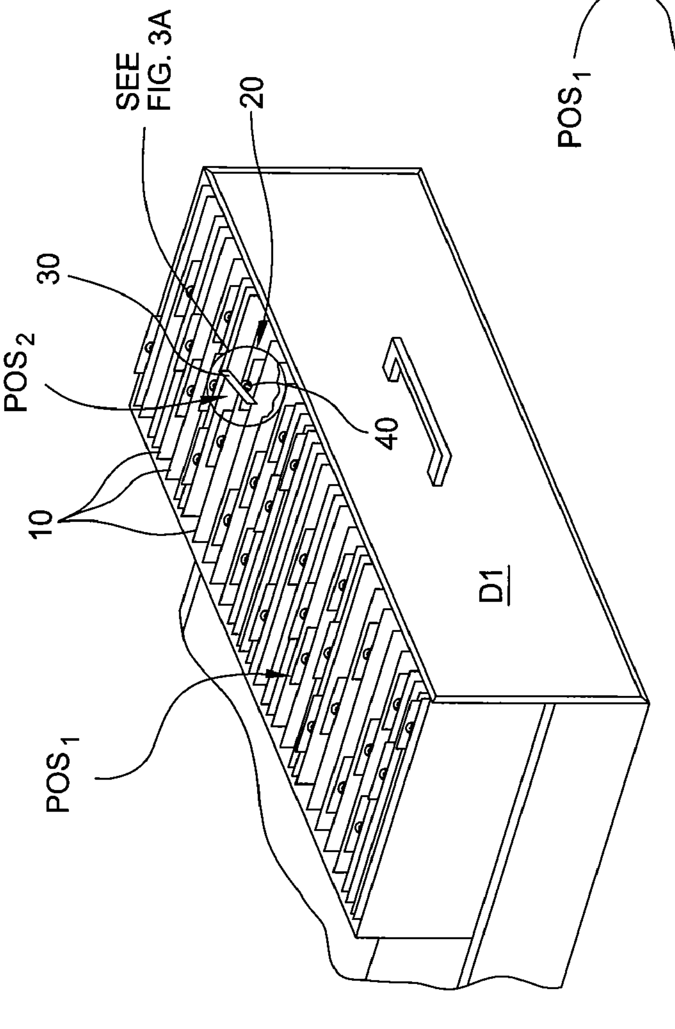
FIG. 2A is an isometric view of a lateral file drawer and file folders having file tabs according to embodiments described herein.
Figure 2B:
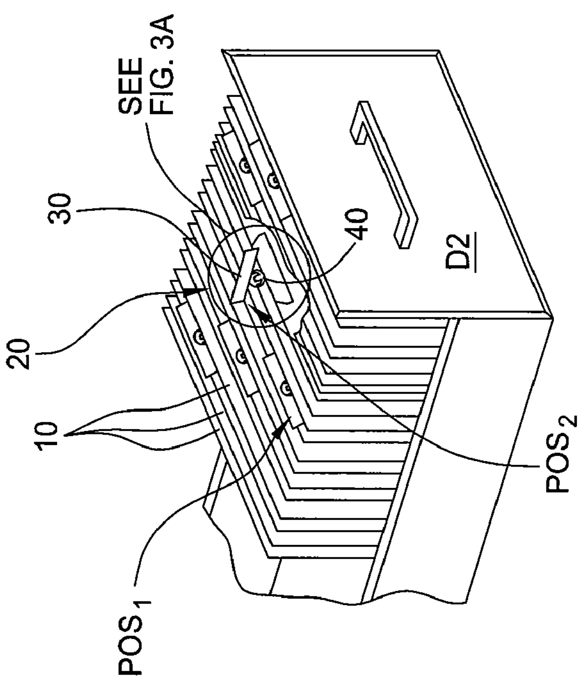
FIG. 2B is an isometric view of a vertical file drawer and file folders having file tabs according to embodiments described herein.

FIGS. 2A and 2B are isometric views of portions of conventional file drawers having a plurality of file folders 10 disposed therein. Specifically, file drawer D1 is a lateral file drawer and file drawer D2 is a vertical file drawer. At least a portion of the file folders 10 include a file folder identification device 20 coupled to the respective file folder 10. Each file folder identification device 20 includes a tab portion 30 that is adapted to contain identification information relating to the contents of the file folder 10.

The file folder identification device 20 provides viewing of the tab portion 30 at different angles and orientations. For example, file folder identification device 20 may be positionable at a first position $POS_1$ relative to the orientation of the file folder 10 that may be similar to the position and orientation of conventional file tabs. The file folder identification device 20 may be repositioned to a second position $POS_2$ that is different than position $POS_1$. In one embodiment, the file folder identification device 20 provides a rotatable interface 40 that allows the tab portion 30 to be moved relative to the file folder 10 about a rotational axis. The rotatable interface 40 may also provide a detachable connection between the file folder 10 and the tab portion 30. A user may adjust the positional orientation of the tab portion 30 manually with a simple movement of the user's hand, which does not require substantial movement or re-positioning of the user's body in order to clearly view the information disposed on the tab portion 30.

The positional range of motion provided by the rotatable interface 40 allows a user to reposition the tab portion 30 relative to the file folder 10 to enable viewing of the tab portion 30 at an angle or position relative to the orientation of the file folder 10. In one embodiment, a user may re-position the tab portion 30 from position $POS_1$ to position $POS_2$, or vice versa, at the users will.

In another embodiment, the rotatable interface 40 allows a user to re-position the tab portion 30 at desirable orientations or angular positions between position $POS_1$ and position $POS_2$. Additionally, the file folder identification device 20 may also provide an identification function for adjacent file folders 10. For example, if a user removes a file folder 10, the tab portion 30 of an adjacent file folder 10 may be positioned in a manner to identify and alert the user to the location of the removed file by twisting the tab portion of the adjacent file to indicate a position of the removed file folder. Thus, the file folder identification device 20 makes tasks involving identification of file folders more efficient and faster. The file folder identification device 20 may additionally enhance user safety by allowing the user to view the file tabs without undo movement or a change in position.

Figure 2D:
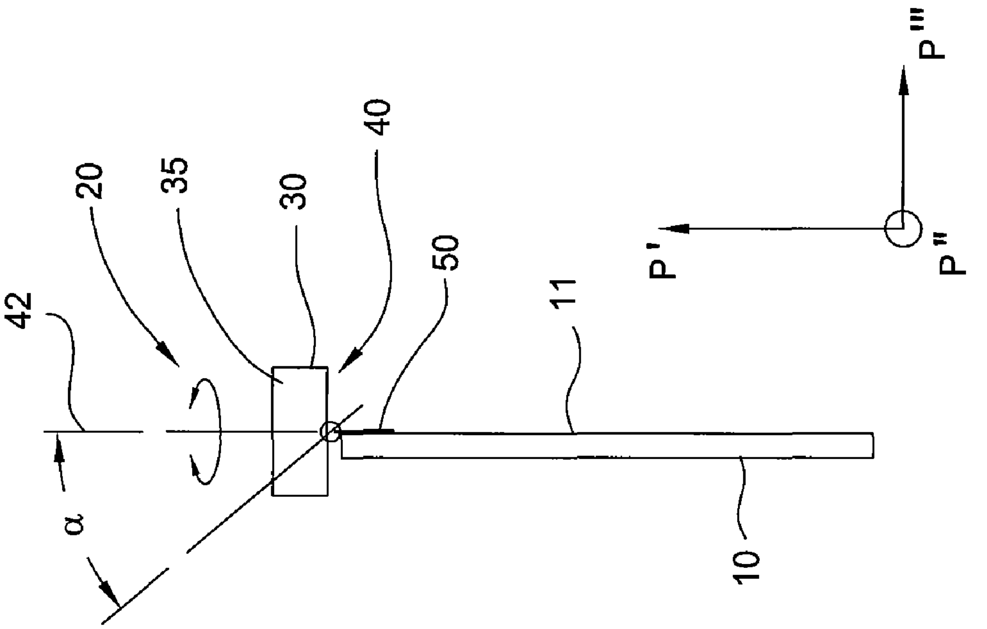
FIG. 2D is a side view of the file folder of FIG. 2C wherein a tab portion of the file folder identification device is rotated along a rotational axis.
Figure 2C:
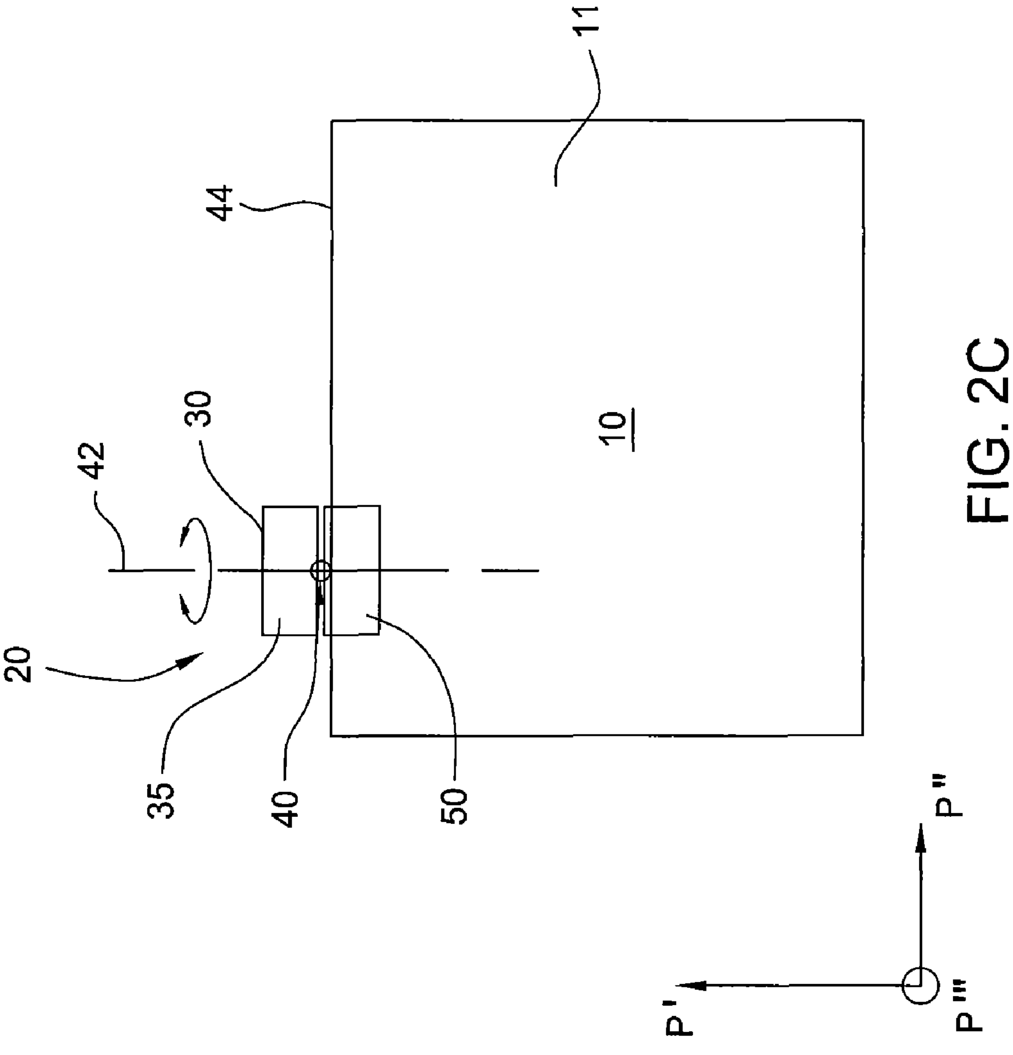
FIG. 2C is a side view of a file folder having a one embodiment of a file folder identification device.

FIG. 2C is a side view of a file folder 10 having a one embodiment of a file folder identification device 20 disposed thereon. The file folder 10 has a front 11 which lies in the P'/P" plane. The tab portion 30 rotates relative to a base 50 on a rotational axis 42 such that the tab portion 30 may be rotated out of the P'/P" plane of the front 11 of the file folder 10.

FIG. 2D is a side view of the file folder 10 of FIG. 2C wherein the tab portion 30 is rotated along the rotational axis 42. The rotational axis 42 also includes at least one vector defined in the direction of the P' axis, and may be coplanar and/or parallel to the P'/P" plane. In one embodiment, the rotational axis 42 allows a face 35 of the tab portion 30 to be rotated to an orientation normal to the direction of the P" axis. It is also contemplated that the rotatable connection 40 may allow the rotational axis 42 to be inclined to an angle a relative to the P' axis, which allows the face 35 of the tab portion 30 to be inclined to a position which allows the face 35 of the tab portion 30 to be read more readily from a vantage point above a top edge 44 of the file folder 10 (i.e., a line normal to the plane of the face 35 may be rotated to include a vertical (P') component).

Figures 3A, 3B, 3C, 3D, 4A, 4B:
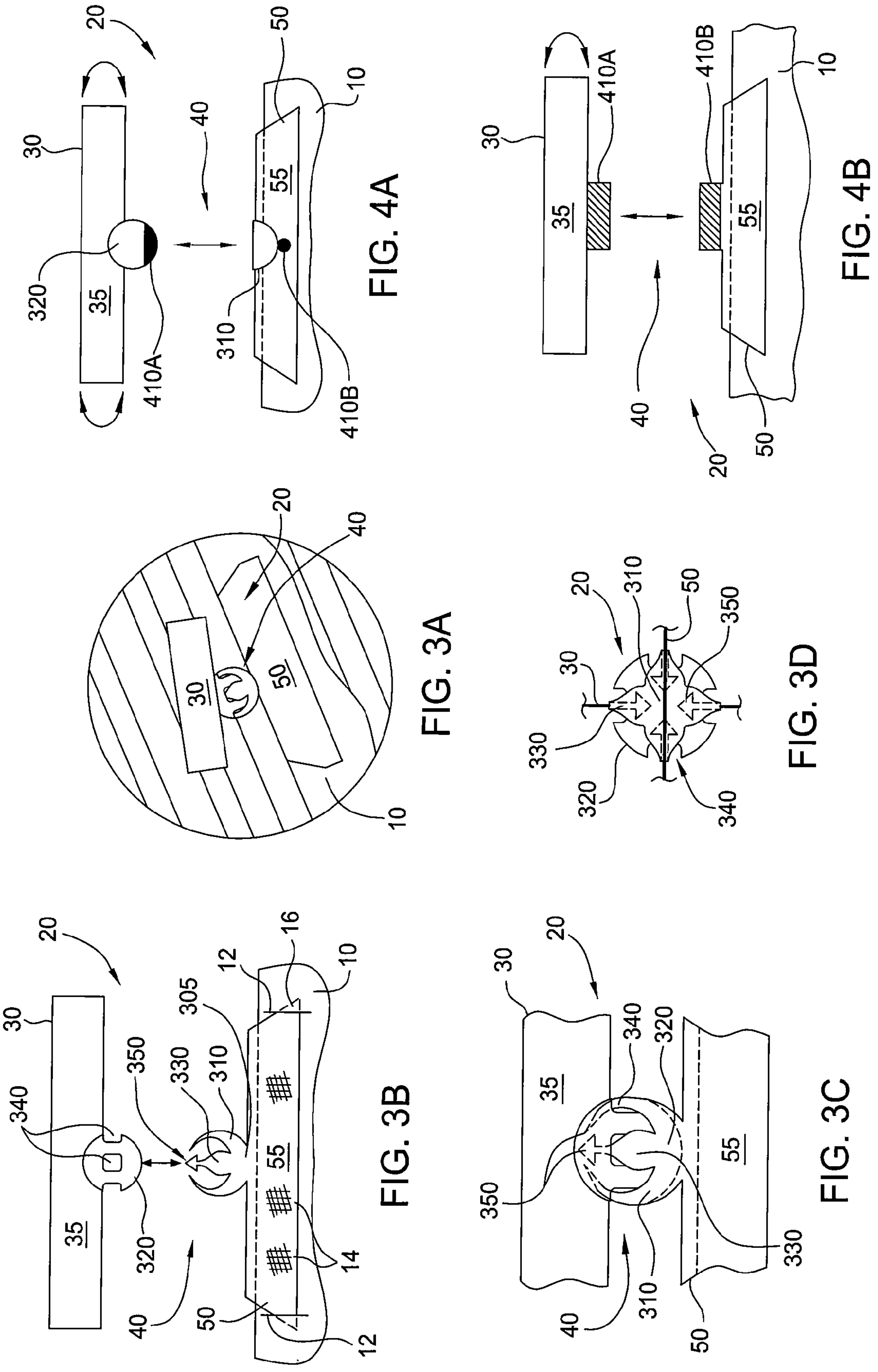
FIG. 3A is an isometric view of one embodiment of a file folder identification device.
FIG. 3B is a side view showing one embodiment of a file folder identification device in a detached position.
FIG. 3C is a side view of the file folder identification device of FIG. 3B in an attached position.
FIG. 3D is a bottom view of a file folder identification device in a rotated and attached position.
FIG. 4A is a side view of another embodiment of a file folder identification device in a detached position.
FIG. 4B is a side view of another embodiment of a file folder identification device in a detached position.

FIG. 3A is an isometric view of one embodiment of a file folder identification device 20. In this embodiment, the file folder identification device 20 includes a tab portion 30 coupled to a base 50 by a rotatable connection 40. In this embodiment, the rotatable connection 40 is adapted to rotate in increments of about 90°. At least a portion of the file folder identification device 20 may be made of a polymeric material, such as a flexible or semi-flexible plastic material.

FIG. 3B is a side view showing one embodiment of a file folder identification device 20 in a detached position. In this embodiment, the file folder identification device 20 includes a rotatable connection 40 comprising at least one substantially spherical portion shown as a receiver 310 and a ball 320. The ball 320 is coupled to the tab portion 30 and the receiver 310 is coupled to the base 50. The base 50 may be coupled to the file folder 10 mechanically or frictionally, such as by portions of the base 50 inserted into slits 12 formed in the upper portion of the file folder 10. The base 50 may include at least one flexible end 16 adapted to bend and insert into a slit 12. Alternatively or additionally, the base 50 may be adhesively coupled to the upper portion of the file folder 10, such as by an adhesive 14. In one embodiment, the base 50 includes the adhesive 14, which may be glue, single or double-sided tape, among other adhesives.

The tab portion 30 includes a face 35 adapted to retain identification information related to the contents of the file folder 10. In one embodiment, the face 35 may be adapted to receive a label, either adhered or otherwise coupled to the face 35 and/or tab portion 35. Additionally or alternatively, the face 35 may be adapted to be printed on or include printed characters that identify the file folder 10.

In this embodiment, the rotatable connection 40 provides a rotatable interface between the tab portion 30 and the base 50, which includes the receiver 310 having a plurality of flexible fingers 330. The receiver 310 is coupled to the base 50 by a mounting portion 305. The mounting portion 305 is configured as a substantially static connection between a first coupling portion 55 and the receiver 310, which is configured as a second coupling portion of the base 50. The mounting portion 305 may be one or both of the lower portion of the receiver 310 and an extension of the base 50. The mounting portion 305 may include a dimension to vary the height of the receiver 310 in a manner that may raise or lower the height of the receiver 310, and therefore, the height of the tab portion 30. For example, the mounting portion 305 may include a length of a few millimeters to space the receiver 310 away from the base 50. In this manner, the tab portion 30, when attached to the receiver 310, may be higher in order to clear adjacent file folders 10.

The tab portion 30 includes the substantially spherical ball 320 adapted to be received by the receiver 310. In this embodiment, the ball 320 includes a plurality of openings 340 each adapted to receive a finger 330 of the receiver 310. In one embodiment, the receiver 310 includes four fingers 330 and the ball 320 includes four openings 340 positioned at substantially 900 increments. In this manner, the tab portion 30 rotated in increments of about 90°, 120° and 270°, among other positional orientations by a user. Once rotated, the tab portion 30 is held relatively static by the receiver 310 and retains the positional orientation of the tab portion 30 relative to the base 50. In one embodiment, at least one of the plurality of fingers 330 includes a barbed end 350 to enhance coupling between the ball 320 and the receiver 310.

FIG. 3C is a side view of the file folder identification device 20 of FIG. 3B in an attached position. As shown, at least a portion of the fingers 330 of the receiver 310 are inserted into the openings 340 of the ball 320. To reposition the tab portion 30, a user may pull the tab portion 30 away from the base 50, which removes the fingers 330 from the openings 340. The tab portion 30 may be rotated and reattached to the base 50 by applying slight pressure to push the tab portion 30 against the base 50. Each of the fingers 330 may be curved inward as shown in FIG. 3B and are adapted to easily slide around a lower portion of the ball 320. When the upper portion of the fingers 330 are received by the openings 340, the fingers 330 may spring to enhance coupling or gripping of the fingers 330 to the ball 320.

FIG. 3D is a bottom view of a file folder identification device 20 in a rotated position. In this embodiment, the tab portion 30 and the ball 320 have been rotated 90° relative to the base 50 and receiver 310. At least a portion of the fingers 330 of the receiver 310 are inserted into the openings 340 of the ball 320. In this position, the tab portion 30 is held relatively static by the receiver 310 and retains the positional orientation of the tab portion 30 relative to the base 50.

FIG. 4A is a side view of another embodiment of a file folder identification device 20 in a detached position. In this embodiment, the file folder identification device 20 includes a rotatable connection 40, which is shown as a substantially spherical ball 320 adapted to be coupled to a receiver 310. In one embodiment, the rotatable connection 40 may be a mechanical connection, a magnetic connection, and combinations thereof, as well as other connections suitable for providing rotation and/or disengagement and reattachment of the tab portion 30 and the base 50. In one embodiment, the receiver 310 includes a substantially hemispherical or cup shape. While the rotatable connection 40 is shown as a ball 320 adapted to couple to a cup-shaped receiver 310, any suitable form of arcuate shapes may be used for one or both of the ball 320 and receiver 310. For example, the ball 320 may include a flat portion and/or the receiver 310 may only include a portion of a spherical shape.

In this embodiment, one or both of the receiver 310 and the ball 320 include a temporary fastener 410A, 410B. The temporary fastener 410A and/or 410B may be a magnetically attractive material, such as a metallic material and/or a magnetic material. In one embodiment, at least one of the temporary fasteners 410A, 410B may be a magnetic material and/or a magnetically attractive material. For example, temporary fastener 410A may be a magnetic material and temporary fastener 410B may be a magnetically attractive material. In another embodiment, the temporary fastener 410A, 410B may be a hook and loop connection, such as a VELCRO® connection. In another embodiment, the temporary fastener 410A, 410B may be a snap fastener. As an example, temporary fastener 410A may include a male portion and temporary fastener 410B may include a female portion adapted to interlock with the male portion. It is also contemplated that the tab portion 30 from one file folder identification device 20 may be attached to a base 50 on another file folder if desired by the user. For example, if the contents of a first file folder are transferred to another or a second file folder, the tab portion 30 from the first file folder may be transferred and coupled to the second file folder.

FIG. 4B is a side view of another embodiment of a file folder identification device 20 in a detached position. In this embodiment, the file folder identification device 20 includes a rotatable connection 40 shown in cross section as temporary fastener 410A and temporary fastener 410B. The rotatable connection 40 includes a temporary fastener 410A coupled to the tab portion 30 and a temporary fastener 410B coupled to the base 50. In this embodiment, one or both of the temporary fastener 410A and 410B have a substantially flat or planar mating surface. Alternatively, one or both of the temporary fastener 410A and 410B may be round or circular, rectangular, or other polygonal shape.

In one embodiment, the rotatable connection 40 may be a mechanical connection, a magnetic connection, and combinations thereof, as well as other connection devices, methods, and apparatus providing suitable repositioning and/or disengagement and reattachment of the tab portion 30 and the base 50. In one embodiment (not shown), the rotatable connection may comprise a shaft adapted to rotate about an axis. The temporary fasteners 410A, 410B may be a mechanical connection, a magnetic connection, and combinations thereof, as well as other connection devices, methods, and apparatus providing rotation and/or disengagement and reattachment of the tab portion 30 and the base 50. The temporary fastener 410A and/or 410B may be a magnetic material, such as a metallic material and/or a magnetically attractive material. In one embodiment, at least one of the temporary fasteners 410A, 410B may be a magnetic material and/or a magnetically attractive material. For example, temporary fastener 410A may be a magnetic material and temporary fastener 410B may be a magnetically attractive material. In another embodiment, the temporary fastener 410A, 410B may be a hook and loop connection, such as a VELCRO® connection. In another embodiment, the temporary fastener 410A, 410B may be a snap fastener. As an example, temporary fastener 410A may include a male portion and temporary fastener 410B may include a female portion adapted to interlock with the male portion.

The temporary fasteners 410A may be coupled at any angle relative to the file folder 10 and/or the base 50. In one embodiment, the tab portion 30 may be rotated relative to the base 50 in any increment between greater than 0° to 360° or any angle between greater than 0° to 360°, and re-attached by a user. In another embodiment, the temporary fasteners 410A and 410B may remain in mechanical or magnetic communication and rotated in increments of in any angle between greater than 0° to 360°. In this manner, the tab portion 30 may be detached from the base 50 or remain in magnetic contact. Once re-attached, the tab portion 30 is held relatively static by the receiver 310 and retains the positional orientation of the tab portion 30 relative to the base 50.

While the foregoing is directed to embodiments of the invention, other and further embodiments of the invention may be devised without departing from the basic scope thereof, and the scope thereof is determined by the claims that follow.

What is claimed is:

1. A file folder identification apparatus, comprising:

a base (50) comprising a first coupling portion (310) and a second coupling portion (320), the first coupling portion (310) opposing the second coupling portion (320) and configured for attachment to an edge of a file folder; and a tab portion (30) including a face (35) configured to retain identification information; and, a decouplable spheroid interface (40) including the first coupling portion (310) and the second coupling portion (320) that when coupled allows the second coupling portion (320) to rotate unimpededly 360 degrees in an axis that is perpendicular to the attached edge of the file folder and to be rotatably and angularly movable relative to the first coupling portion (310); and the apparatus in which the tab (30) is coupled to the second coupling portion (320).

2. The apparatus of claim 1, wherein the first coupling portion comprises an adhesive.

3. The apparatus of claim 1, wherein the first coupling portion comprises at least one flexible end.

4. The apparatus of claim 1, wherein the base comprises a flexible material.

5. The apparatus of claim 1, wherein the interface and the second coupling portion comprises a temporary fastener.

6. The apparatus of claim 5, wherein the temporary fastener is selected from the group comprising a plurality of flexible fingers, a snap fastener, or a magnetic material.

7. The apparatus of claim 1, wherein the second coupling portion comprises a temporary fastener.

8. The apparatus of claim 7, wherein the temporary fastener is selected from the group comprising a plurality of flexible fingers, a snap fastener, or a magnetic material.

9. The apparatus of claim 1, wherein the second coupling portion comprises a plurality of flexible fingers.

10. The apparatus of, claim 9, wherein the interface comprises a plurality of openings adapted to receive the plurality of flexible fingers.

11. A file folder identification apparatus, comprising:

a base (50), comprising:

a first coupling portion (310) and a second coupling portion (320), the first coupling portion opposing the second coupling portion (320) and configured for coupling to an edge of a file folder; and a tab portion, comprising:

an interface comprising a temporary fastener detachably coupled to the first coupling portion (310) and a face (35) configured to retain identification information, the interface being rotatable unimpededly 360 degrees about a vertical axis perpendicular to the edge of the file folder and angularly and rotatably coupled to the base.

12. The apparatus of claim 11, wherein the temporary fastener is selected from the group comprising a plurality of flexible fingers, a snap fastener, a hook and loop connection, or a magnetic material.

13. The apparatus of claim 11, wherein the tab portion is rotatable at 90° increments relative to the base.

14. The apparatus of claim 11, wherein the tab portion is rotatable at an angle greater than about 0° to about 360° relative to the base.

* * * * *